(12) United States Patent
Schultheiss et al.

(10) Patent No.: US 11,175,173 B2
(45) Date of Patent: Nov. 16, 2021

(54) RADAR TRANSCEIVER CHIP

(71) Applicant: VEGA Grieshaber KG, Wolfach (DE)

(72) Inventors: Daniel Schultheiss, Hornberg (DE); Christoph Mueller, Oppenau (DE)

(73) Assignee: VEGA GRIESHABER KG, Wolfach (DE)

( * ) Notice: Subject to any disclaimer, the term of this patent is extended or adjusted under 35 U.S.C. 154(b) by 344 days.

(21) Appl. No.: 16/246,640

(22) Filed: Jan. 14, 2019

(65) Prior Publication Data

US 2019/0219435 A1   Jul. 18, 2019

(30) Foreign Application Priority Data

Jan. 16, 2018   (DE) ...................... 10 2018 200 647.4

(51) Int. Cl.
*G01F 23/284*   (2006.01)
*G01S 13/88*   (2006.01)
(Continued)

(52) U.S. Cl.
CPC ............ *G01F 23/284* (2013.01); *G01S 7/032* (2013.01); *G01S 7/35* (2013.01); *G01S 13/88* (2013.01); *H01Q 23/00* (2013.01)

(58) Field of Classification Search
CPC .......... G01F 23/284; G01S 7/03; G01S 7/032; G01S 7/35; G01S 13/88
See application file for complete search history.

(56) References Cited

U.S. PATENT DOCUMENTS

| | | | | | |
|---|---|---|---|---|---|
| 4,931,799 | A | * | 6/1990 | Wen | ........................ G01S 7/026 342/110 |
| 5,315,303 | A | * | 5/1994 | Tsou | .................... H01Q 1/3233 342/27 |

(Continued)

FOREIGN PATENT DOCUMENTS

| CN | 103297045 | 9/2013 |
|---|---|---|
| DE | 102009001046 | 9/2009 |

(Continued)

OTHER PUBLICATIONS

Ozturk et al., "A 60-GHz SiGe BiCMOS Monostatic Transceiver for FMCW Radar Applications", IEEE Transactions on Microwave Theory and Techniques, vol. 65, No. 12, Dec. 2017, pp. 5309-5323.

(Continued)

*Primary Examiner* — Peter M Bythrow
(74) *Attorney, Agent, or Firm* — Fay Kaplun & Marcin, LLP

(57) ABSTRACT

A radar transceiver chip for transmitting a transmission signal and for receiving a received signal is proposed. The radar transceiver chip includes a transmitting branch, a receiving branch, a coupler, by means of which the transmitting branch is coupled to the receiving branch, and exactly one antenna terminal for connecting an external antenna to the radar transceiver chip. The coupler is coupled to the antenna terminal and is configured to output at least a portion of the transmission signal to the antenna terminal and to feed at least a portion of the received signal, received via the antenna terminal, into the receiving branch, the receiving branch comprising a receiving mixer which is configured to generate an intermediate frequency signal on the basis of the received signal.

17 Claims, 3 Drawing Sheets

(51) Int. Cl.
*G01S 7/35* (2006.01)
*G01S 7/03* (2006.01)
*H01Q 23/00* (2006.01)

(56) References Cited

U.S. PATENT DOCUMENTS

| | | | |
|---|---|---|---|
| 5,596,325 A * | 1/1997 | Maas | G01S 7/036 342/28 |
| 6,087,978 A * | 7/2000 | Lalla | G01S 13/103 342/118 |
| 7,639,102 B2 | 12/2009 | Wagner et al. | |
| 9,331,797 B2 | 5/2016 | Kordik et al. | |
| 2005/0001632 A1 * | 1/2005 | Schmidt | H01Q 23/00 324/644 |
| 2005/0168379 A1 * | 8/2005 | Griessbaum | G01S 13/10 342/124 |
| 2006/0017606 A1 * | 1/2006 | Hayata | H03B 19/14 342/41 |
| 2009/0015465 A1 * | 1/2009 | Kanaya | H03D 9/0633 342/200 |
| 2009/0206945 A1 * | 8/2009 | Wagner | H03H 7/461 333/101 |
| 2009/0212997 A1 * | 8/2009 | Michalski | G01S 7/285 342/137 |
| 2009/0221258 A1 * | 9/2009 | Steinbuch | G01S 7/032 455/326 |
| 2010/0223019 A1 * | 9/2010 | Griessbaum | G01F 23/2962 702/75 |
| 2011/0205105 A1 * | 8/2011 | Reuter | G01S 7/038 342/200 |
| 2012/0098698 A1 * | 4/2012 | Reuter | G01S 7/03 342/200 |
| 2012/0112956 A1 * | 5/2012 | Trotta | H04B 1/525 342/165 |
| 2012/0154203 A1 * | 6/2012 | Vacanti | G01S 13/44 342/149 |
| 2012/0169528 A1 * | 7/2012 | Edvardsson | H01Q 1/225 342/124 |
| 2014/0047896 A1 * | 2/2014 | Griessbaum | G01S 7/4021 73/1.73 |
| 2014/0085132 A1 * | 3/2014 | Jirskog | G01S 13/88 342/124 |
| 2014/0253367 A1 * | 9/2014 | Michalski | H03D 7/1458 342/124 |
| 2014/0266866 A1 * | 9/2014 | Swirhun | G01S 7/03 342/188 |
| 2014/0292563 A1 * | 10/2014 | Palmer | G01S 7/26 R |
| 2015/0002330 A1 * | 1/2015 | Binzer | G01S 7/032 342/175 |
| 2016/0087734 A1 * | 3/2016 | Kordik | H04B 17/14 455/67.14 |
| 2018/0128900 A1 * | 5/2018 | Al Hadi | G01S 7/03 |
| 2018/0252807 A1 * | 9/2018 | Fox | G01S 13/904 |

FOREIGN PATENT DOCUMENTS

| | | |
|---|---|---|
| DE | 102015115017 | 3/2016 |
| EP | 1523784 | 4/2005 |
| EP | 1610147 | 12/2005 |
| WO | 2003/041117 | 5/2003 |
| WO | 2012/152474 | 11/2012 |

OTHER PUBLICATIONS

Tessmann et al., "Compact Single-Chip W-Band FMCW Radar Modules for Commercial High-Resolution Sensor Applications", IEEE Transactions on Microwave Theory and Techniques, vol. 50, No. 12, Dec. 2002, pp. 2995-3001.

* cited by examiner

RADAR TRANSCEIVER CHIP

CROSS-REFERENCE TO RELATED APPLICATIONS

This application claims the benefit of the filing date of DE Patent Application Ser. No. 10 2018 200 647.4 filed on 16 Jan. 2018, the entire content of which is incorporated herein by reference.

FIELD OF THE INVENTION

The invention generally relates to the field of radar sensors. The invention relates, in particular, to a radar transceiver chip, the use of a radar transceiver chip of this kind for filling level measurement, and a filling level measurement device comprising a radar transceiver chip of this kind.

BACKGROUND

Radar-based filling level measurement devices and/or filling level radar measurement devices comprise a radar module for generating a transmission signal. In order to determine a filling level of a medium, the transmission signal is radiated, for example by means of an antenna, towards a surface of the medium, a portion of the transmission signal being reflected at the surface and in turn received by the filling level measurement device as a received signal. The distance between the filling level measurement device and the surface of the medium and/or the filling level of the medium can thus be ascertained on the basis of a propagation delay method.

In order to generate the transmission signal and/or to evaluate the received signal, complex electronic circuits may sometimes be necessary.

SUMMARY OF THE INVENTION

Embodiments of the present disclosure relate to a radar transceiver chip and/or a filling level measurement device.

One of aspects of the present disclosure relates to a radar transceiver chip, a single radar chip and/or a radar chip for transmitting a transmission signal and for receiving a received signal. The radar transceiver chip comprises a transmitting branch for generating a transmission signal, a receiving branch for receiving and/or evaluating a received signal, a coupler, by means of which the transmitting branch is coupled to the receiving branch and/or which couples the transmitting branch to the receiving branch, and precisely one (exactly one) and/or one single antenna terminal for connecting an external antenna to the radar transceiver chip. In this case, the coupler is coupled to the antenna terminal and is configured to output at least a portion of the transmission signal to the antenna terminal and to feed at least a portion of the received signal, received via the antenna terminal, into the receiving branch. Furthermore, the receiving branch comprises a receiving mixer which is configured to generate an intermediate frequency signal on the basis of the received signal.

The coupler can in particular be coupled, wired and/or connected directly to the antenna terminal. The coupler can therefore wire the transmission signal and the received signal directly to the antenna terminal.

The transmitting branch can generally denote a transmission channel and/or a transmission circuit of the radar transceiver chip. Likewise, the receiving branch can denote a receive channel and/or a receiving circuit of the radar transceiver chip. The transmission signal generated by the transmitting branch can be output to the antenna terminal via the coupler at least in part, and radiated, for example towards a surface of a medium, by means of an antenna that is coupled to the antenna terminal for example. A portion of the transmission signal can be reflected at the surface of the medium and fed into the receiving branch, as the received signal, via the antenna, the antenna terminal and/or the coupler. It is thus possible for a spacing between the radar transceiver chip or a filling level measurement device comprising the radar transceiver chip, and the medium, to be ascertained on the basis of the intermediate frequency signal generated by the receiving mixer and/or on the basis of an evaluation of the intermediate frequency signal.

Alternatively, or in addition, a filling level of the medium, for example in a container, can be ascertained. For this purpose, the radar transceiver chip may comprise an intermediate frequency output for outputting the intermediate frequency signal, for example to an evaluation circuit and/or to a control unit of a filling level measurement device.

The coupler can generally denote a microwave coupler and/or a radio frequency coupler. The coupler may be formed for example as a power coupler, power splitter, directional coupler and/or hybrid coupler. Alternatively, or in addition to a coupler, a circulator may also be used.

In this case, the radar transceiver chip may be formed as a V-band radar chip, as an E-band radar chip, as a W-band radar chip, as an F-band radar chip, as a D-band radar chip, as a G-band radar chip, as a Y-band radar chip and/or as a J-band radar chip. In other words, a transmission frequency of the transmission signal may be between 60 GHz and 75 GHz (V-Band), between 60 GHz and 90 GHz (E-Band), between 75 GHz and 110 GHz (W-Band), between 90 GHz and 140 GHz (F-Band), between 110 GHz and 170 GHz (D-Band), between 140 GHz and 220 GHz (G-Band), between 170 GHz and 260 GHz (Y-Band), and/or between 220 GHz and 320 GHz (J-Band).

According to an embodiment, the transmitting branch, the receiving branch and the coupler are integrated and/or arranged in the radar transceiver chip. In this case, the radar transceiver chip comprises just one, exclusively one and/or one single antenna terminal. The radar transceiver chip can therefore be configured for a monostatic radar device, a monostatic filling level measurement device and/or a filling level measurement device comprising a single antenna. In this case, the antenna terminal can be configured both for outputting the transmission signal and for receiving and/or feeding in the received signal. The antenna terminal may denote a radio frequency terminal, a radio frequency output and/or a radio frequency input of the radar transceiver chip.

An external coupler can advantageously be omitted and circuit complexity can advantageously be reduced by integrating the coupler in the radar transceiver chip and by providing a single antenna terminal. Robustness and reliability of the radar transceiver chip can also be increased thereby. Furthermore, the scale of integration can be increased and a compact radar transceiver chip can be provided.

Moreover, spatial transfer paths for the transmission signal and/or the received signal within the radar transceiver chip can be significantly shortened compared with conventional circuits, such as on a circuit board. Said spatially very short distances and/or transfer paths can improve the near-field behaviour of the radar transceiver chip and/or of a filling level measurement device comprising a radar transceiver chip of this kind. In this case it is possible in particular to reduce a "ring".

In addition, in the case of high transmission frequencies of the transmission signal, for example in the W-band in the 80 GHz range and/or at frequencies of over 100 GHz, the mechanical tolerances to be adhered to may mean that implementing a coupler for example on a circuit board is very difficult and requires significant manufacturing outlay. Integrating the coupler on the radar transceiver chip can therefore reduce manufacturing outlay and increase reliability and robustness of the radar transceiver chip.

Moreover, providing a single antenna terminal can also increase the reliability and robustness of the radar transceiver chip, because contacting may become increasingly difficult as the transmission frequency of the transmission signal increases. For example, bonding connections at antenna terminals of this kind may be extremely sensitive to transit damping.

According to an embodiment, the transmitting branch, the receiving branch and the coupler are arranged and/or formed on a common substrate. The common substrate may for example comprise silicon-germanium, silicon-germanium-carbide, silicon carbide, gallium arsenide and/or a metal oxide semiconductor material. This can make it possible to produce the radar transceiver chip in a cost-effective manner and so as to have a compact structure.

According to an embodiment, the transmitting branch comprises an oscillator for generating an oscillator signal, the oscillator being arranged on a common substrate of the radar transceiver chip or outside a common substrate of the radar transceiver chip. In other words, the oscillator may be arranged directly on the substrate of the radar transceiver chip or may be connected to further components of the transmitting branch by means of an electrical connection. The oscillator signal generated by the oscillator can be processed further, for example amplified and/or frequency multiplied, and thus form the transmission signal. Alternatively, or in addition, the oscillator signal generated by the oscillator may also function as the transmission signal.

According to an embodiment, the transmitting branch comprises a power splitter which is coupled to the oscillator, the coupler and the receiving mixer and is configured to output at least a portion of the oscillator signal to the receiving mixer. Alternatively, or in addition, the receiving mixer may be configured to generate the intermediate frequency signal on the basis of the received signal and on the basis of at least a portion of the oscillator signal of the oscillator. For example, the intermediate frequency signal may correlate with a difference between the oscillator signal and the received signal. Likewise, the intermediate frequency signal may denote a differential signal of the oscillator signal and of the received signal.

According to an embodiment, the coupler is configured to output at least a portion of the transmission signal to the receiving mixer. Alternatively, or in addition, the receiving mixer may be configured to generate the intermediate frequency signal on the basis of the received signal and on the basis of at least a portion of the transmission signal. For example, the intermediate frequency signal may correlate with a difference between the transmission signal and the received signal. Likewise, the intermediate frequency signal may denote a differential signal of the portion of the transmission signal and of the received signal. As a result, an additional power splitter for outputting a portion of the oscillator signal to the receiving mixer can be omitted.

According to an embodiment, the antenna terminal is configured as a differential or as an unbalanced terminal and/or signal output. In other words, the antenna terminal may be configured for differential or unbalanced signalling. In the case of differential signalling, also referred to as balanced signalling, the signalling usually takes place in a wire pair, the signal itself being transmitted on one line and a reference signal, phase-shifted by 180° with respect to the signal, being transmitted on the other line. Capacitive and/or inductive interference can thus be almost entirely eliminated by means of establishing the difference between the signal and the reference signal. In contrast thereto, in the case of unbalanced signalling, also referred to as single-ended signalling, the signalling usually takes place in just one wire, in which for example a voltage signal changes relative to a chassis ground and/or relative to ground.

According to an embodiment, the transmitting branch and/or the receiving branch is differential and/or configured for differential signalling at least in part. The transmitting branch and/or the receiving branch may also be entirely differential and/or configured for differential signalling. Alternatively, or in addition, the coupler, the receiving mixer and/or an intermediate frequency output of the radar transceiver chip for outputting the intermediate frequency signal may be differential and/or configured for differential signalling.

According to an embodiment, the transmitting branch is differential and/or configured for differential signalling. In this case, the transmitting branch may comprise a balun that is coupled to the coupler and is configured for converting a balanced transmission signal into an unbalanced transmission signal. In this case, the balun (BALanced-UNbalanced) may denote a balancer of the radar transceiver chip. In particular, the balun of the transmitting branch may be connected upstream of the coupler, relative to a signalling path of the transmission signal.

According to an embodiment, the receiving branch is differential and/or configured for differential signalling. In this case, the receiving branch may comprise a balun that is coupled to the coupler, and/or a balancer, for converting an unbalanced received signal into a balanced received signal. In particular, the balun of the receiving branch may be connected downstream of the coupler and/or upstream of the receiving mixer, relative to a signalling path of the received signal.

According to an embodiment, the coupler is differential and/or configured for differential signalling. In this case, the antenna terminal can also be differential. Alternatively, or in addition, a balun and/or a balancer may be coupled between the differential coupler and the antenna terminal.

According to an embodiment, the transmitting branch comprises a transmission amplifier for amplifying the transmission signal, a frequency multiplier for increasing a transmission frequency of the transmission signal, and/or a frequency mixer for increasing a transmission frequency of the transmission signal. The transmitting branch may also comprise a phase-locked loop, by means of which the transmission frequency of the transmission signal can be regulated. For example, during a measuring cycle the transmission frequency can be increased in a ramp-like manner from a start frequency to an end frequency. The radar transceiver chip can thus be configured as an FMCW (frequency modulated continuous wave) radar chip. The transmission frequency can also be increased in a stepwise manner, during a measuring cycle, from the start frequency to the end frequency, and/or the radar transceiver chip can be configured as an SFCW (stepped frequency continuous wave) radar chip. Furthermore, the receiving branch may comprise a receiving amplifier for amplifying the received signal.

A further aspect of the present disclosure relates to the use of a radar transceiver chip, as described above and in the following, for determining a filling level of a medium, for example a medium in a container.

A further aspect of the present disclosure relates to a filling level measurement device for ascertaining a filling level of a medium, for example a medium in a container. The filling level measurement device comprises a radar transceiver chip as described above and in the following.

The filling level measurement device further comprises an antenna which is coupled to the antenna terminal of the radar transceiver chip. In particular, the filling level measurement device may comprise a single antenna which may be coupled to a single radar transceiver chip of the filling level measurement device. In other words, the filling level measurement device may be a monostatic filling level measurement device. In this case, the antenna may be a patch antenna or a horn radiator antenna. In this case, the radio frequency signal may also firstly be coupled into a waveguide in order to be able to remove the antenna from further components of the filling level measurement device, in particular from the radar transceiver chip, and/or such that the antenna is removed from further components of the filling level measurement device, in particular from the radar transceiver chip.

Features and/or elements of the radar transceiver chip, as described above and in the following, may be features and/or elements of the filling level measurement device, as described above and in the following. Likewise, features and/or elements of the filling level measurement device, as described above and in the following, may be features and/or elements of the radar transceiver chip, as described above and in the following.

Exemplary embodiments will be described in the following, with reference to the drawings. In this case, the same reference signs may denote identical, identically functioning or similar elements.

The illustrations in the figures are merely schematic and are not to scale.

DETAILED DESCRIPTION

Figure 1:
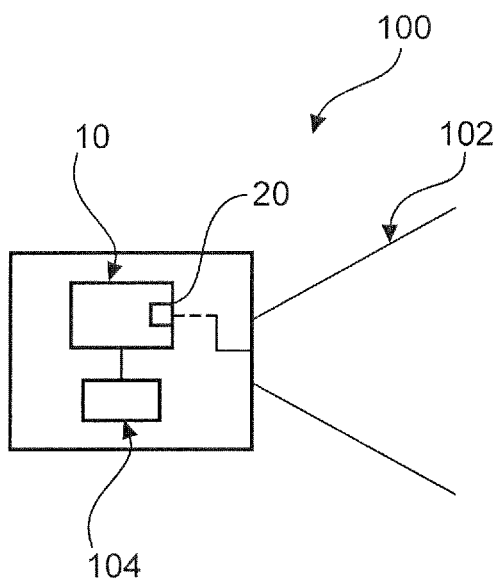
FIG. 1 shows a filling level measurement device according to an embodiment of the present invention.

FIG. 1 shows a filling level measurement device 100 according to an embodiment.

The filling level measurement device 100 comprises a radar transceiver chip 10 for transmitting a transmission signal and for receiving and/or evaluating a received signal, as will be described in detail in the following figures.

The filling level measurement device 100 further comprises an antenna 102 which is coupled to the antenna terminal 20 of the radar transceiver chip 10. The transmission signal can be output to the antenna 102 by means of the antenna terminal 20 and can be radiated by said antenna towards a surface of a medium, for example a medium in a container. A portion of the transmission signal can be reflected by the medium and received by the antenna 102 as the received signal and fed into the radar transceiver chip 10 via the antenna terminal 20. The antenna 102 can be configured as desired in this case. For example, the antenna 102 may be configured as a patch antenna 102 and/or as a horn radiator antenna 102. In particular, the filling level measurement device comprises precisely one and/or one single antenna 102.

As will be explained in detail in the following figures, the radar transceiver chip 10 can generate an intermediate frequency signal on the basis of the received signal, which intermediate frequency signal can be provided to an evaluation circuit 104 and/or a control unit 104 of the filling level measurement device 100 for evaluation. The evaluation circuit 104 can ascertain a spacing between the filling level measurement device 100 and the medium and/or a filling level of the medium on the basis of the intermediate frequency signal. The ascertained filling level can then be shown on a display of the filling level measurement device 100 for example and/or output via a data interface of the filling level measurement device 100.

The filling level measurement device 100 may also be formed as a two-wire filling level measurement device 100, for example as a 4-20 mA two-wire filling level measurement device 100. In this case, the filling level measurement device 100 may comprise a 4-20 mA current control stage, such that a measured value that correlates with the ascertained filling level can be output and/or transmitted via a power supply line of the filling level measurement device 100, as a power signal having a current value of between 4 mA and 20 mA.

Figure 2:
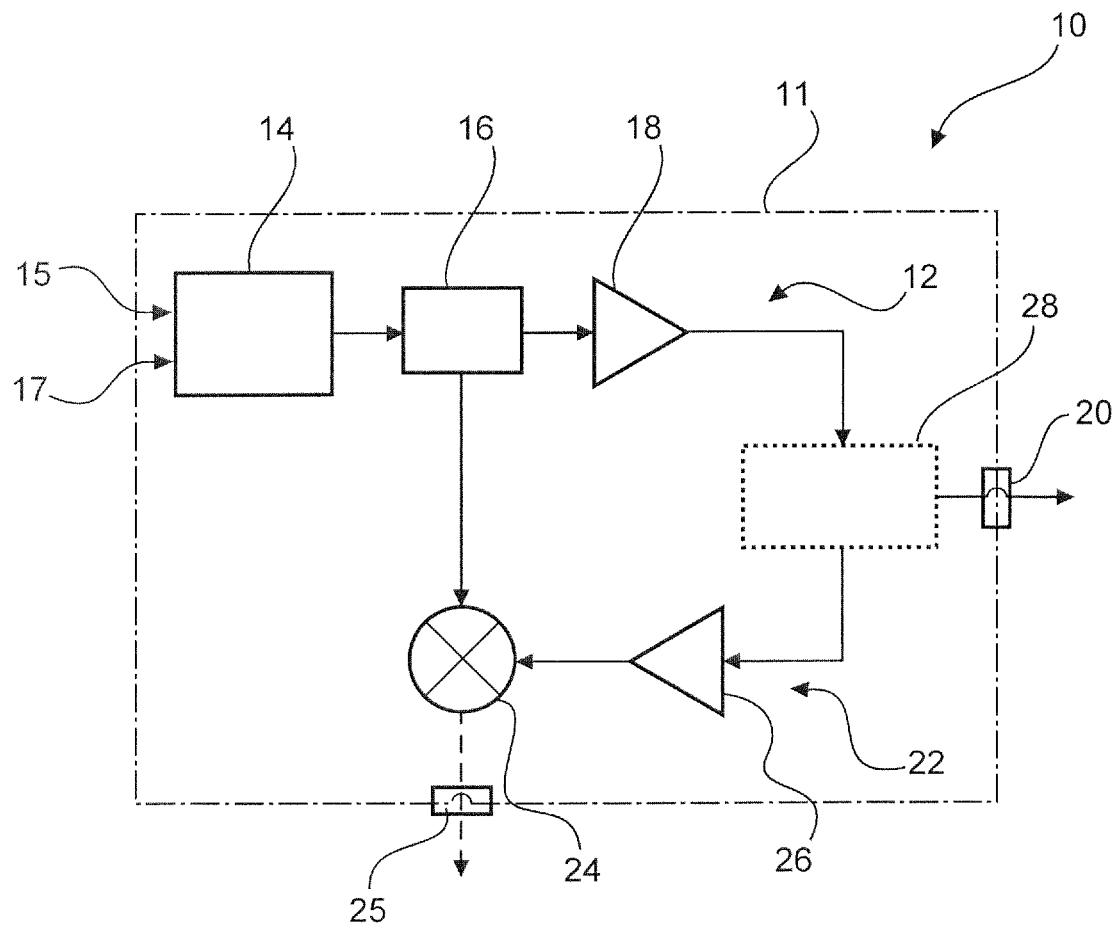
FIGS. 2 to 6 each show a radar transceiver chip according to an embodiment of the present invention.

FIG. 2 shows a radar transceiver chip 10 according to an embodiment. Unless described otherwise, the radar transceiver chip 10 of FIG. 2 comprises the same elements and/or features as the radar transceiver chip 10 of FIG. 1.

The radar transceiver chip 10 comprises a transmitting branch 12 and/or transmission channel 12 comprising an oscillator 14 for forming and/or generating an oscillator signal. The oscillator 14 may be configured in particular as a voltage-controlled oscillator 14 (VCO). For example, the oscillator 14 and/or a frequency of the oscillator signal may be regulated by means of a voltage signal applied at a control input 15 of the oscillator 14. The voltage signal may be delivered via a control input 15 coupled to the phase-locked loop for example. The oscillator 14 may furthermore optionally comprise a prescaler terminal 17 for connection to a prescaler. In this case, said signal is a divided-down signal of the VCO output signal which is usually provided for operating a phase-locked loop or PLL. Alternatively, a portion of the VCO output signal (without frequency division) can be conducted to the outside for regulating purposes.

The transmitting branch 12 optionally comprises a transmission amplifier 18, in particular a power amplifier 18, for amplifying the oscillator signal. The oscillator signal and/or the amplified oscillator signal thus forms a transmission signal of the transmitting branch 12 and/or of the radar transceiver chip 10.

The radar transceiver chip further comprises a receiving branch 22 for receiving and/or evaluating a received signal. For this purpose, the receiving branch comprises a receiving mixer 24 which is configured to generate an intermediate frequency signal on the basis of the received signal.

In the embodiment shown in FIG. 2, the transmitting branch 12 further comprises a power splitter 16 which is coupled to the oscillator 14, the receiving mixer 24 and the transmission amplifier 18. A portion of the oscillator signal can be decoupled from the transmitting branch 12 and fed to the receiving mixer 24 by means of the power splitter 16.

The power splitter 16 can also follow an amplifier stage of the oscillator 14 and/or an amplifier may be connected upstream of the power splitter 16. Likewise, the signal that is output by the power splitter 16 towards the receiving mixer 24 can be amplified again, in particular separately, for example using an amplifier, for example in order to be able to provide a sufficient level for the receiving mixer 24.

In this case, the receiving mixer 24 can generate the intermediate frequency signal for example by calculating a difference between the portion of the oscillator signal and of the received signal. An intermediate frequency output 25 can feed the intermediate frequency signal to an evaluation circuit 104 for example, which evaluation circuit can determine a spacing from a medium and/or a filling level of a medium on the basis of the intermediate frequency signal.

The receiving branch 22 optionally comprises a receiving amplifier 26, for example a low-noise amplifier LNA, that is connected upstream of the receiving mixer 24 and is intended for amplifying the received signal.

Furthermore, the radar transceiver chip 10 comprises a coupler 28 by means of which the transmitting branch 12 is coupled and/or connected to the receiving branch 22. Likewise, the transmitting branch 12 and the receiving branch 22 can be combined by means of the coupler 28. The coupler 28 may denote a microwave coupler 28 and/or a radio frequency coupler 28 for example. In particular, the coupler 28 may be formed as a power coupler, directional coupler and/or hybrid coupler.

The coupler 28 is directly coupled and/or connected to the antenna terminal 20, to which an external antenna 102 can be connected. In this case, the radar transceiver chip 10 comprises just one, precisely one and/or one single antenna terminal 20. In this case, the antenna terminal 20 may be a radio frequency terminal, a radio frequency output and/or a radio frequency input of the radar transceiver chip 10.

A dynamic response of the radar transceiver chip 10 is explained in the following. The oscillator 14 generates the oscillator signal and outputs said signal to the power splitter 16. The power splitter 16 decouples a portion of the oscillator signal and/or a portion of the power of the oscillator signal from the transmitting branch 12 and feeds said portion to the receiving mixer 24. The remaining portion of the oscillator signal is fed to the transmission amplifier 18, said portion of the oscillator signal and/or the amplified oscillator signal forming the transmission signal of the transmitting branch 12. Since the transmission amplifier 18 is merely optional and can be omitted, the power splitter 16 can also be coupled directly to the coupler 28. In this case, the portion of the oscillator signal that is fed to the coupler 28 via the power splitter 16 forms the transmission signal. The transmission signal is then fed to the coupler 28 which outputs said signal to the antenna terminal 20. The transmission signal can then be radiated towards a medium, for example by means of the antenna 102, it being possible for a portion of the transmission signal to be reflected and received as the received signal by the antenna 102. The received signal is fed to the coupler 28 by means of the antenna terminal 20, which coupler feeds said signal to the receiving branch 22. The received signal is fed to the receiving amplifier 26 for amplification, and the amplified received signal is output to the receiving mixer 24. The receiving mixer 24 generates the intermediate frequency signal on the basis of the portion of the oscillator signal fed to the receiving mixer 24 and on the basis of the received signal, which intermediate frequency signal can be output to an evaluation circuit 104 via the intermediate frequency output 25. The evaluation circuit 25 can finally ascertain a filling level of the medium on the basis of an evaluation of the intermediate frequency signal.

The radar transceiver chip 10 shown in FIG. 2 comprises a substrate 11 and/or a common substrate 11, on which the transmitting branch 12, the receiving branch 22 and the coupler 28 are arranged and/or formed. In particular, the oscillator 14, the power splitter 16, the transmission amplifier 18, the coupler 28, the receiving amplifier 26 and the receiving mixer 24 are arranged on the substrate 11. It should be mentioned, however, that individual components, such as the oscillator 14, may also be arranged outside the common substrate 11. The common substrate 11 may comprise silicon-germanium, silicon-germanium-carbide, silicon carbide, gallium arsenide and/or a metal oxide semiconductor material. However, any other semiconductor technology is also conceivable.

Figure 4:
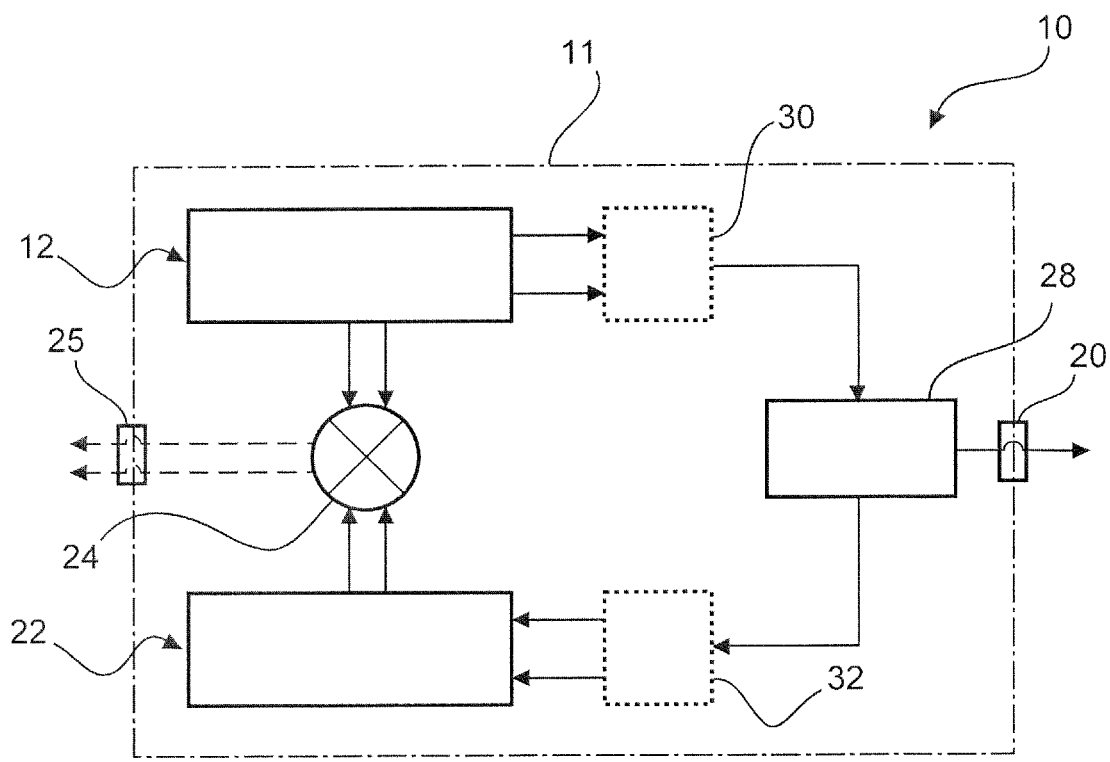
Figure 5:
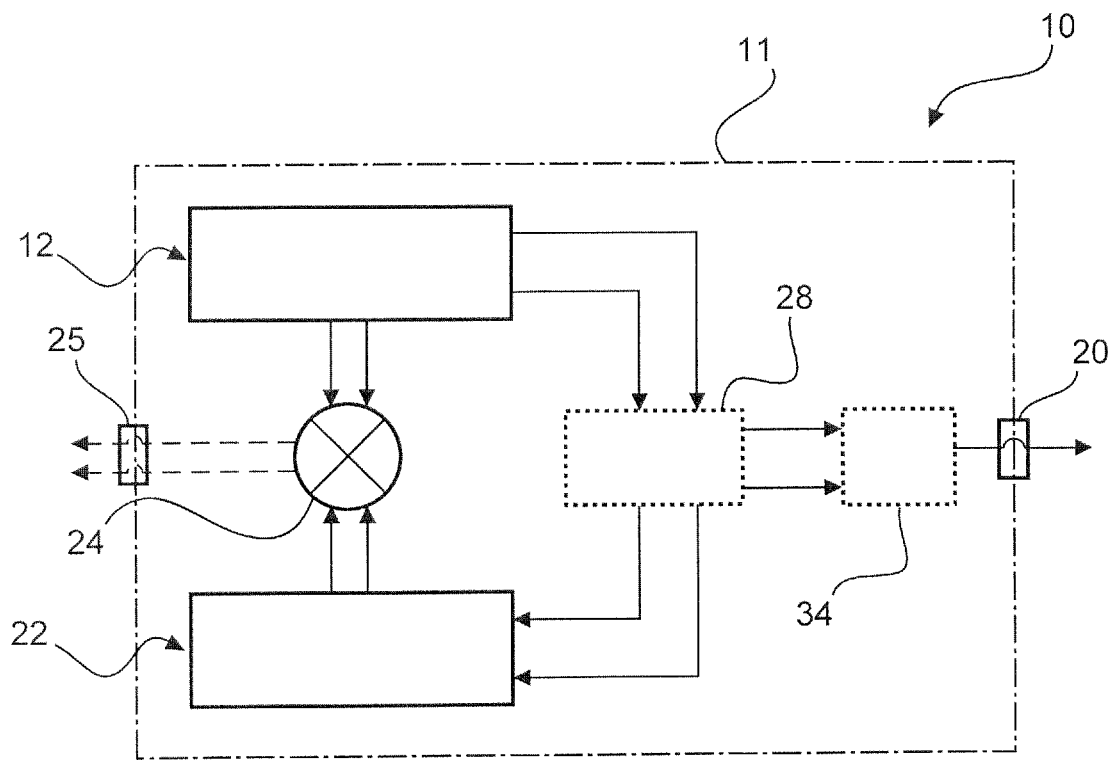
Figure 6:
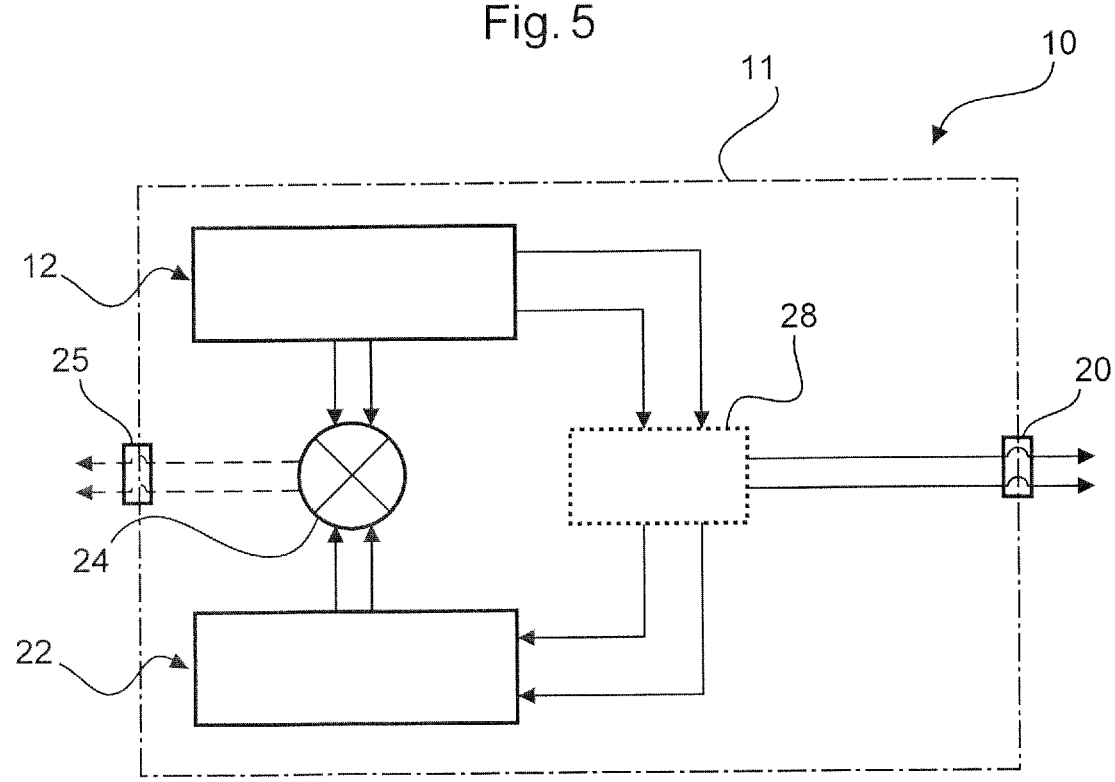

In the embodiment shown in FIG. 2, the transmitting branch 12, the receiving branch 22, the coupler 28, the antenna terminal 20 and the intermediate frequency output 25 are configured for unbalanced signalling. However, some or all of said components could also be configured for differential or balanced signalling, as shown in FIGS. 4 to 6.

The transmitting branch 12 may optionally comprise a frequency multiplier and/or a mixer for increasing the transmission frequency of the transmission signal. In this case, the frequency multiplier and/or the mixer may be arranged on the common substrate 11 or outside the common substrate 11.

In contrast to the radar transceiver chip 10 according to the present disclosure, in which chip the coupler 28 is integrated, conventional radar transceiver chips generally do not contain the coupler 28. Said coupler is frequently implemented externally, for example on the circuit board or as a waveguide coupler. In addition, conventional radar systems and/or conventional filling level measurement devices frequently use radar transceiver chips having a different number of transmission channels and receive channels. In the case of radar transceiver chips of this kind, it is neither possible nor desirable to integrate the coupler 28 on the chip.

Figure 3:
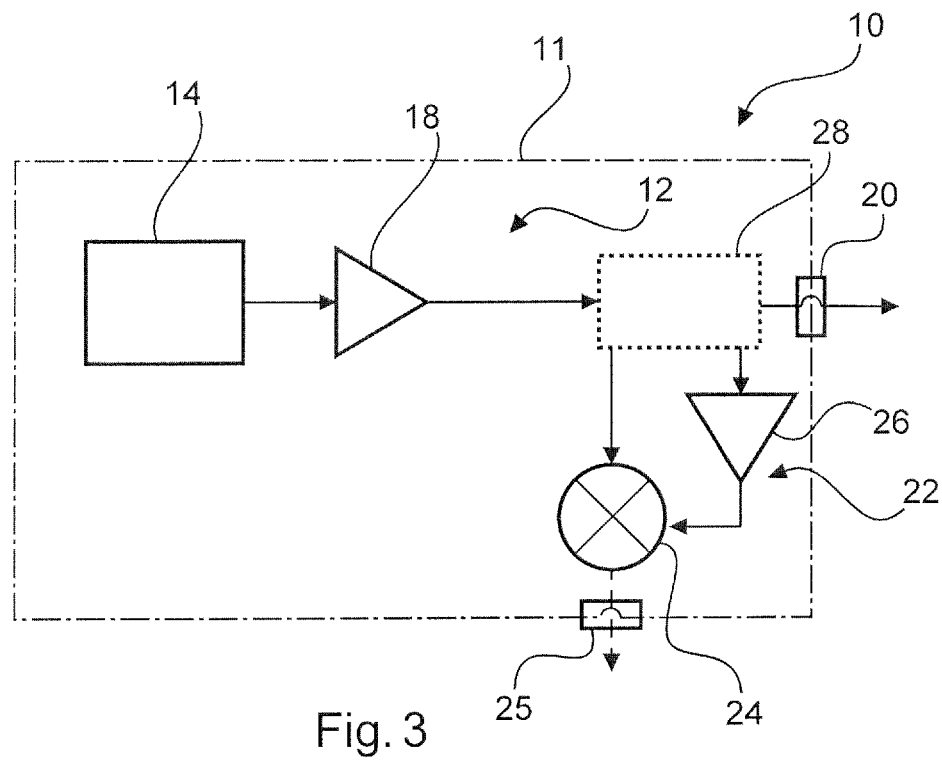

FIG. 3 shows a radar transceiver chip 10 according to an embodiment. Unless described otherwise, the radar transceiver chip 10 of FIG. 3 comprises the same elements and/or features as the radar transceiver chip 10 of FIGS. 1 and 2.

In the embodiment shown in FIG. 3, the coupler 28 is coupled to the receiving mixer 24 and the coupler 28 is configured to output at least a portion of the transmission signal to the receiving mixer 24. The receiving mixer 24 is furthermore configured to generate the inteimediate frequency signal on the basis of the received signal and on the basis of at least a portion of the transmission signal which is output by the coupler 28 to the receiving mixer 24. The power splitter 16 described in FIG. 1 can thus be omitted. In this case, the coupler 28 may for example be formed as a hybrid coupler or hybrid and/or as a rat-race coupler or rat-race.

FIG. 4 shows a radar transceiver chip 10 according to an embodiment. Unless described otherwise, the radar transceiver chip 10 of FIG. 4 comprises the same elements and/or features as the radar transceiver chip 10 of FIGS. 1 to 3.

In the embodiment illustrated in FIG. 4, the transmitting branch 12 and the receiving branch 22 are differential and/or configured for differential signalling. For purposes of illustration and clarity, in FIG. 4 a large part of the receiving branch 22 is shown schematically as a box and the receiving mixer 24 is shown as a separate component. However, in accordance with the present disclosure, the receiving mixer 24 is part of the receiving branch 22.

In particular the transmitting branch 12 may comprise an oscillator 14, a power splitter 16 and/or a transmission amplifier 18 which may each be differential. The receiving branch 22 may in turn comprise a differential receiving mixer 24 and a differential receiving amplifier 26. In the example shown in FIG. 4, the intermediate frequency output 25 is also differential.

However, the coupler 28 and the antenna terminal 20 of the embodiment shown in FIG. 4 are configured for unbalanced signalling. The transmitting branch 12 therefore comprises a first balun 30 and/or a first balancer 30 that is connected upstream of the coupler 28. The first balun 30 can convert a balanced transmission signal into an unbalanced transmission signal which can then be fed to the coupler 28.

Analogously, the receiving branch 22 comprises a second balun 32 and/or a second balancer 32 that is connected downstream of the coupler 28. The second balun 32 can convert an unbalanced received signal, output by the coupler 28, into a balanced received signal which can then be fed to further components of the receiving branch 22, such as the receiving amplifier 26 and/or the receiving mixer 24.

FIG. 5 shows a radar transceiver chip 10 according to an embodiment. Unless described otherwise, the radar transceiver chip 10 of FIG. 5 comprises the same elements and/or features as the radar transceiver chip 10 of FIGS. 1 to 4. For purposes of illustration and clarity, analogously to FIG. 4, in FIG. 5 a large part of the receiving branch 22 is shown schematically as a box and the receiving mixer 24 is shown as a separate component. However, in accordance with the present disclosure, the receiving mixer 24 is part of the receiving branch 22.

In contrast to the embodiment of FIG. 4, in the embodiment of FIG. 5 the coupler 28 is also differential and/or configured for differential signalling. However, analogously to FIG. 4, the antenna terminal 20 is configured for unbalanced signalling. A balun 34 and/or a balancer 34 is therefore coupled between the coupler 28 and the antenna terminal. A balanced or differential transmission signal, output to the antenna terminal 20 by the coupler 28, can be converted by the first balun 34 into an unbalanced transmission signal and output to the antenna terminal 20. Analogously, the balun 34 can convert an unbalanced received signal, output to the antenna terminal 20 by the coupler 28, into a balanced or differential received signal which can then be fed the coupler 28 and/or the receiving branch 22.

FIG. 6 shows a radar transceiver chip 10 according to an embodiment. Unless described otherwise, the radar transceiver chip 10 of FIG. 5 comprises the same elements and/or features as the radar transceiver chip 10 of FIGS. 1 to 5. For purposes of illustration and clarity, analogously to FIGS. 4 and 5, in FIG. 6 a large part of the receiving branch 22 is shown schematically as a box and the receiving mixer 24 is shown as a separate component. However, in accordance with the present disclosure, the receiving mixer 24 is part of the receiving branch 22.

In contrast to the embodiment of FIG. 5, in the embodiment of FIG. 6 the antenna terminal 20 is also differential and/or configured for differential signalling. As a result, the entire radar transceiver chip 10 of FIG. 6 is differential and/or configured for differential signalling. A balun 30, 32, 34 and/or a balancer 30, 32, 34 can therefore be omitted entirely in the embodiment shown in FIG. 6.

In addition, it should be noted that "having" and "comprising" do not exclude any other elements or steps, and "one" and "a" do not exclude a plurality. It should furthermore be noted that features and steps that have been described with reference to one of the above embodiments can also be used in combination with other features or steps of other embodiments described above. Reference signs in the claims are not to be considered limiting.

The invention claimed is:

1. A radar transceiver chip for transmitting a transmission signal and receiving a received signal, comprising:
   a transmitting branch generating a transmission signal;
   a receiving branch receiving a received signal;
   a coupler, the transmitting branch being coupled to the receiving branch via the coupler; and
   exactly one antenna terminal connecting an external antenna to the radar transceiver chip;
   wherein the coupler is coupled to the antenna terminal, the coupler being configured to output at least a portion of the transmission signal to the antenna terminal and to feed at least a portion of the received signal, received via the antenna terminal, into the receiving branch,
   wherein the receiving branch includes a receiving mixer which is configured to generate an intermediate frequency signal as a function of the received signal, and
   wherein the antenna terminal is configured as an unbalanced terminal.

2. The radar transceiver chip according to claim 1, wherein the transmitting branch, the receiving branch and the coupler are arranged on a common substrate.

3. The radar transceiver chip according to claim 2, wherein the common substrate comprises at least one of silicon-germanium, silicon-germanium-carbide, silicon carbide, gallium arsenide and a metal oxide semiconductor material.

4. The radar transceiver chip according to claim 1, wherein the transmitting branch includes an oscillator generating an oscillator signal; and wherein the oscillator is arranged on a common substrate of the radar transceiver chip or outside of the common substrate of the radar transceiver chip.

5. The radar transceiver chip according to claim 4, wherein the transmitting branch includes a power splitter which is coupled to the oscillator, the coupler and the receiving mixer, the power splitter being configured to output at least a portion of the oscillator signal to the receiving mixer.

6. The radar transceiver chip according to claim 4, wherein the receiving mixer is configured to generate the intermediate frequency signal as a function of the received signal and at least a portion of the oscillator signal.

7. The radar transceiver chip according to claim 1, wherein the coupler is configured to output at least a portion of the transmission signal to the receiving mixer.

8. The radar transceiver chip according to claim 1, wherein the receiving mixer is configured to generate the intermediate frequency signal as a function of the received signal and at least a portion of the transmission signal.

9. The radar transceiver chip according to claim 1, wherein the transmitting branch and/or the receiving branch is differential at least in part.

10. The radar transceiver chip according to claim 1, wherein the transmitting branch is differential and comprises a balun that is coupled to the coupler, the balun being configured to convert a balanced transmission signal into an unbalanced transmission signal.

11. The radar transceiver chip according to claim 1, wherein the receiving branch is differential and comprises a balun that is coupled to the coupler, the balun being configured to convert an unbalanced received signal into a balanced received signal.

12. The radar transceiver chip according to claim 1, wherein the coupler, the receiving mixer and/or an intermediate frequency output is configured so as to be differential in order to output the inter mediate frequency signal.

13. The radar transceiver chip according to claim 1, wherein the coupler is differential.

14. The radar transceiver chip according to claim 1, wherein a balun is coupled between the coupler and the antenna terminal.

15. The radar transceiver chip according to claim 1, wherein the transmitting branch includes at least one of a transmission amplifier amplifying the transmission signal, a frequency multiplier increasing a transmission frequency of the transmission signal, and a frequency mixer increasing a transmission frequency of the transmission signal.

16. The radar transceiver chip according to claim 1, wherein the receiving branch includes a receiving amplifier amplifying the received signal.

17. A filling level measurement device for determining a filling level of a medium, comprising:
   a radar transceiver chip according to claim 1; and
   an antenna coupled to the antenna terminal of the radar transceiver chip.

* * * * *